United States Patent Office 3,850,984
Patented Nov. 26, 1974

3,850,984
PROCESS FOR SEPARATING SODIUM NITRILO-
TRIACETATE FROM A MIXTURE CONTAINING
THE SAME AND SODIUM CHLORIDE
Charles M. Selwitz, Monroeville, Pa., assignor to Gulf
Research & Development Company, Pittsburgh, Pa.
No Drawing. Filed Sept. 27, 1971, Ser. No. 184,281
Int. Cl. C07c 99/12
U.S. Cl. 260—534 E     3 Claims

ABSTRACT OF THE DISCLOSURE

A process for separating sodium nitrilotriacetate from a mixture containing it and sodium chloride which involves maintaining an aqueous slurry of the mixture at a relatively low temperature, separating a fraction rich in sodium chloride from the slurry and then recovering a fraction rich in sodium nitrilotriacetate from the remaining aqueous phase.

---

This process is directed to a procedure for recovering a fraction predominating in sodium nitrilotriacetate (SNTA) from a mixture containing SNTA and sodium chloride.

SNTA and sodium chloride can be found in admixture with each other and the separation of the former from the latter, or the recovery of a mixture predominating in SNTA from the original mixture, is often desirable. For example, SNTA can be prepared by the well-known procedure which is exemplified by the following equations:

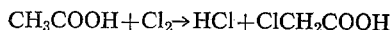
$$CH_3COOH + Cl_2 \rightarrow HCl + ClCH_2COOH$$

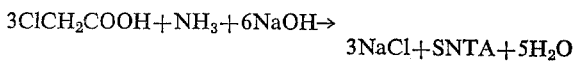
$$3ClCH_2COOH + NH_3 + 6NaOH \rightarrow$$
$$3NaCl + SNTA + 5H_2O$$

The recovery of SNTA from the latter mixture can be effected in accordance with acidification-neutralization procedures exemplified by the following equations:

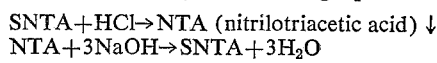
$$SNTA + HCl \rightarrow NTA \text{ (nitrilotriacetic acid)} \downarrow$$
$$NTA + 3NaOH \rightarrow SNTA + 3H_2O$$

Such recovery is expensive, since it requires additional processing steps and the use of additional chemicals.

I have found that a fraction rich in SNTA can be obtained from a mixture containing the same and sodium chloride by the relatively simple procedure of maintaining an aqueous slurry of the mixture at a relatively low temperature, whereby SNTA is selectively dissolved in the water, separating a fraction rich in sodium chloride from the slurry and thereafter recovering a fraction rich in SNTA from the remaining aqueous phase. This procedure is effective because I have found, unexpectedly, that the solubility of SNTA surprisingly increases with decreasing temperature.

The process is easily effected. Initially an aqueous slurry of SNTA and sodium chloride is obtained wherein about 25 to about 50 percent by weight of the slurry, preferably from about 37 to about 47 percent by weight of the slurry is composed of water. The mixture of SNTA and sodium chloride being treated, on a water-free basis, can be from about 50 to about 85 percent by weight of SNTA and from about 15 to about 50 percent by weight of sodium chloride, but generally from about 60 to about 80 percent by weight of SNTA and from about 20 to about 40 percent by weight of sodium chloride. The slurry so obtained is maintained at a temperature of about +30° to about −30° C., preferably in the range of about +5° to about −25° C. for a time sufficient to reach equilibrium, for example, from about one minute to about five hours, preferably from about 15 minutes to about one hour. Since this process involves a liquid-solids phenomenon pressure is of no significance and therefore atmospheric pressure is preferred. Although relatively low temperatures are used herein, no freezing problems have been encountered.

At the end of this time the solids, which are composed mainly of sodium chloride and small amounts of SNTA, are separated from the slurry by any suitable means, for example, by filtration. The filtrate is then treated in any suitable manner to remove water therefrom, for example, by heating, leaving behind a solids fraction which is composed mainly of SNTA with small amounts of sodium chloride. The composition of the two solids fractions will depend on the composition of the charge being treated, to a greater extent on the amount of water used during the extraction but, most of all, on the temperature used during the extraction procedure. Surprisingly, I have found that as the extraction temperature decreases the solubility of SNTA in water increases.

The process herein can further be illustrated by the following. Several runs were made wherein water was added to mixtures of SNTA and sodium chloride to form slurries therewith. After each of the slurries was held at selected temperatures for a period of 15 minutes, the slurry was filtered and the filtrate subjected to evaporation at a temperature of 100° C. to remove water therefrom, leaving behind solids. The filter cake and the solids from the filtrate were analyzed. The results obtained are tabulated below in Table I.

TABLE I

| Run number | Charge, grams | | Ml. H₂O added | Temp., °C. | Filter cake, grams | | Filtrate, grams | | Percent by weight of SNTA remaining in filter cake |
|---|---|---|---|---|---|---|---|---|---|
| | SNTA | NaCl | | | SNTA | NaCl | SNTA | NaCl | |
| 1 | 30 | 20 | 40 | 25 | 6.3 | 13.3 | 23.7 | 6.7 | 21 |
| 2 | 30 | 20 | 40 | 5 | 3.6 | 13.4 | 26.4 | 6.6 | 12 |
| 3 | 30 | 20 | 40 | −25 | 0.3 | 13.9 | 29.7 | 6.1 | 1 |
| 4 | 30 | 20 | 30 | −10 | 6.9 | 14.7 | 23.1 | 5.3 | 23 |
| 5 | 30 | 20 | 30 | −25 | 5.4 | 15.3 | 24.6 | 4.7 | 18 |
| 6 | 40 | 10 | 40 | 5 | 7.6 | 4.7 | 32.4 | 5.3 | 19 |
| 7 | 40 | 10 | 40 | −10 | 6.8 | 5.6 | 33.2 | 4.4 | 17 |
| 8 | 40 | 10 | 40 | −25 | 4.4 | 6.0 | 35.6 | 4.0 | 11 |

The advantages of operating under the process defined herein are obvious from the above. It can be seen from Runs Nos. 1, 2 and 3 that as the temperature of extraction was reduced, unexpectedly the amount of SNTA dissolved in the water increased significantly. Even though in the sets of Runs Nos. 4 and 5 and Nos. 6, 7 and 8, the conditions were not optimum, in that less water was present than might be desirable in a commercial embodiment, nevertheless, it will be noted that as the extraction temperature was reduced, significantly more SNTA was found in the filtrate. In none of the runs was freezing of water noted. If desired, the operation defined herein can be repeated with the filter cake to selectively remove therefrom any additional SNTA associated therewith. Although in the above runs water was added to the mixture of SNTA and sodium chloride to obtain a slurry containing a selected amount of water prior to extraction, it is within the scope of the process to treat slurries containing SNTA, sodium chloride and water in excess of the amount that is desired to be present during the extraction. In the latter situation, prior to extraction, water in excess of that desired during extraction is removed from the slurry by any suitable means, for example, by evaporation or distillation. The recovered product can be used, for example, as a detergent builder.

Obviously, many modifications and variations of the invention, as hereinabove set forth, can be made without departing from the spirit and scope thereof, and therefore only such limitations should be imposed as are indicated in the appended claims.

I claim:

1. A process for separating sodium nitrilotriacetate from a mixture containing the same, wherein the mixture contains from about 50 to 85 percent of sodium nitrilotriacetate and from about 15 to about 50 percent by weight of sodium chloride, which consists in maintaining an aqueous slurry thereof, wherein from about 37 to about 47 percent by weight is water, at a temperature of about $+5°$ to about $-25°$ C. for about one minute to about five hours, separating solids from said slurry and then recovering a fraction richer in sodium nitrilotriacetate from the remaining liquid than was present in the mixture.

2. The process of clam 1 wherein the solids are separated from said slurry by filtration.

3. The process of claim 1 wherein sodium nitrilotriacetate is recovered from said remaining liquid by treating to remove water therefrom.

References Cited

OTHER REFERENCES 3,433,832  3/1969  Swanson et al. ____ 260—534 S
3,183,262  5/1965  Singer et al. _____ 260—534 E

FOREIGN PATENTS 790,457  2/1958  Great Britain.

OTHER REFERENCES

Mullin, "Crystallization" Butterworths, London (1961) pp. 39–40, 158–159.

N. V. Koninklijke Nederlandse Zoutirdustrie C.A. 53P3557i.

N. V. Koninklijke Nederlandse Zoutindustrie C.A. 54P3887f.

Vogel "Practical Organic Chemistry" Wiley and Sons (1962), pp. 122–123.

Mullen, "Crystallization," Butterworth and Co. (1961), p. 24.

Vogel "Practical Oragnic Chemistry," Wiley and Sons (1962), p. 151.

LORRAINE A. WEINBERGER, Primary Examiner

J. F. TERAPANE, Assistant Examiner

UNITED STATES PATENT OFFICE
CERTIFICATE OF CORRECTION

Patent No. 3,850,984   Dated November 26, 1974

Inventor(s) Charles M. Selwitz

It is certified that error appears in the above-identified patent and that said Letters Patent are hereby corrected as shown below:

Col. 3, lines 27 and 28, "treating" should read --heating--.

Signed and sealed this 4th day of February 1975.

(SEAL)
Attest:

McCOY M. GIBSON JR.
Attesting Officer

C. MARSHALL DANN
Commissioner of Patents